United States Patent [19]

Helling et al.

[11] Patent Number: 4,459,130

[45] Date of Patent: Jul. 10, 1984

[54] SOLID PREPARATION OF WATER-SOLUBLE ACID DYE AND POLYMER PARTICLES WITH QUATERNARY AMMONIUM OR PHOSPHONIUM GROUPS

[75] Inventors: Günter Helling, Odenthal-Gloebusch; Hans Öhlschläger, Bergisch Gladbach; Hans Langen, Bonn, all of Fed. Rep. of Germany

[73] Assignee: Agfa-Gevaert Aktiengesellschaft, Leverkusen, Fed. Rep. of Germany

[21] Appl. No.: 547,466

[22] Filed: Nov. 2, 1983

Related U.S. Application Data

[63] Continuation of Ser. No. 355,890, Mar. 8, 1982, abandoned.

[30] Foreign Application Priority Data

Mar. 14, 1981 [DE] Fed. Rep. of Germany ....... 3109931

[51] Int. Cl.$^3$ ........................ C09B 67/24; G03C 1/84

[52] U.S. Cl. .......................................... 8/554; 8/647; 8/680; 8/584; 8/524; 430/578; 430/941; 526/274; 526/310

[58] Field of Search .......................... 8/554, 647, 680; 430/578, 941; 526/274, 310

[56] References Cited

U.S. PATENT DOCUMENTS

| | | | |
|---|---|---|---|
| 2,882,156 | 4/1959 | Minsk | 430/518 |
| 3,282,699 | 11/1966 | Jones | 430/518 |
| 3,625,694 | 12/1971 | Cohen | 96/84 |
| 3,706,563 | 12/1972 | Ushiyama et al. | 430/518 |
| 3,709,690 | 1/1973 | Cohen et al. | 528/17 |
| 3,756,819 | 9/1973 | Sinclair | 96/48 |
| 3,766,126 | 10/1973 | Siegl et al. | 260/37 N |
| 3,770,439 | 11/1973 | Taylor | 430/213 |
| 3,877,945 | 4/1975 | Rosenhahn et al. | 96/84 A |
| 3,958,995 | 5/1976 | Campbell et al. | 430/518 |
| 4,108,802 | 8/1978 | Wright | 525/328.3 |
| 4,193,800 | 3/1980 | Iwama et al. | 428/509 |
| 4,266,044 | 5/1981 | Timmerman et al. | 525/328.2 |
| 4,353,972 | 10/1982 | Helling et al. | 430/213 |
| 4,379,838 | 4/1983 | Helling et al. | 430/518 |

FOREIGN PATENT DOCUMENTS

| | | |
|---|---|---|
| 2029593 | 3/1980 | United Kingdom . |
| 2062270 | 5/1981 | United Kingdom . |

*Primary Examiner*—A. Lionel Clingman
*Attorney, Agent, or Firm*—Connolly and Hutz

[57] ABSTRACT

A dye preparation consists of a water-soluble acid dye and a water-insoluble basic carrier. The carrier consists of crosslinked polymer particles of average particle diameter of less than 1 μm and contains at least 2 mVal/g of quaternary ammonium or phosphonium groups. The dye reacts with the carrier in an ion exchange reaction and forms a dye polymer latex which can easily isolated in solid form, stored indefinitely and redispersed in water whenever required. It forms a so-called self-dispersing dye preparation. The dye preparation is useful for making dyed layers such as in photographic recording materials.

2 Claims, No Drawings

SOLID PREPARATION OF WATER-SOLUBLE ACID DYE AND POLYMER PARTICLES WITH QUATERNARY AMMONIUM OR PHOSPHONIUM GROUPS

CROSS-REFERENCE TO RELATED APPLICATION

This is a continuation of U.S. patent application Ser. No. 355,890 filed Mar. 8, 1982 now abandoned by Gunter Helling, Hans Ohlschlager, Hans Langen for Dye Preparation.

This invention relates to a solid dye preparation for the production of colored layers, in particular in photographic recording materials.

Photographic recording materials frequently contain colored layers. It is customary to cover the back of roll film and sheet film with colored gelatine layers. These layers are intended not only to reduce the curling tendency but also to absorb as completely as possible any light not absorbed by the emulsion layers when exposure is carried out, so as to prevent light scattering within the layers and hence the formation of a reflected light halo. An improvement can be obtained by arranging the colored layer immediately under the lowermost emulsion layer instead of one the back of the film support, so that reflection of light from the support is also prevented.

In some cases it is also necessary to cover the emulsion layer with a layer of dye in order to keep any unwanted radiation away from the emulsion. Filter layers, for example, are particularly important in multi-layered color photographic recording materials. For example, a yellow filter layer may be required under a blue-sensitive layer in order to prevent blue light entering the underlying layers which have been sensitized to green or red light but also have an intrinsic sensitivity to blue light. It is also known that the sharpness and the reproduction of the green color in the region of exposure to strong light can be improved by providing a filter layer containing a dye capable of absorbing green light between a green-sensitized layer and a red-sensitized layer underneath it.

The dyes used in anti-halation or filter layers must fulfil various requirements. They should have good absorption characteristics, for example, and should be capable of being completely and irreversibly bleached in the usual photographic baths. They should also be readily soluble or dispersible so that they can be introduced at a sufficiently high concentration in the layers, but they must be fixed in the required layer so that they cannot diffuse into adjacent emulsion layers. Resistance to diffusion is also required of dyes in the layer arranged at the back of the film support since this layer may also come into close contact with the emulsion layer, e.g. when a film is rolled up or when sheet films are placed one above the other. The diffusion resistance of dyes must be ensured even under extreme conditions of temperature and moisture.

The dyes used for coloring the layers are in most cases anionic (acid) dyes which are fixed in the layers by means of suitanble mordants.

Polymeric mordants for acid dyes have been described, for example, in German Pat. No. 928,268, U.S. Pat. No. 2,882,156 and German Offenlegungsschriften Nos. 2,113,381, 2,200,063 and 2,315,304. These mordants are not entirely satisfactory in every respect since they are liable to separate by flocculation, or increase the viscosity of the casting solution more than is desired, or they may be incapable of fixing the dyes sufficiently, or they may fix them so firmly that the layers cannot be decolorized by the photographic process. In many cases they also have an undesirable effect on the photographic properties, in particular the properties of the light-sensitive layers. This is presumably due to the low molecular weight constituents present in them, which are often difficult to remove. Owing to the tendency of these mordants to flocculate, the preparation of suitable casting solutions containing these mordants as well as acid dyes is only possible under certain operating conditions and with the aid of auxiliary substances such as wetting agents and binders. Even then, the casting solutions cannot withstand prolonged storage, so that the mordant and dye must be stored separately and can only be combined to form a common casting solution immediately before casting.

It is an object of the present invention to provide a dye preparation with which stable casting solutions may easily be prepared for colored layers, in particular colored photographic layers. It has been found that water-insoluble cross-linked polymer particles, which are capable of swelling in water owing to their quaternary ammonium or phosphonium group content, react with water-soluble acid dyes in aqueous dispersions to undergo an ion exchange reaction giving rise to latices containing dye without any agglomeration or coagulation occurring, even in the absence of auxiliary substances such as wetting agents or protective colloids such as gelatine. These latices containing dye may readily be worked up into an anhydrous form which is stable in storage (e.g. a powder) from which finely divided dye-polymer dispersions may be prepared as required by stirring up in water.

This invention thus provides a solid dye preparation consisting substantially of (a) a water-soluble acid dye, and (b) a water-insoluble basic carrier for the acid dye, wherein the basic carrier consists of cross-linked polymer particles having a particle diameter of less than 1 µm and containing at least 2 mVal/g of quaternary ammonium or phosphonium groups.

The dye preparation according to the present invention thus contains, as an essential constituent, the carrier consisting of cross-linked polymer particles. This substance is a particulate polymer which has preferably already been cross-linked at the stage of polimerization and contains the quaternary ammonium or phosphonium groups at a concentration of at least 2 mVal/g. The quaternary groups preferably correspond to formula I

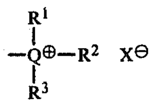

I wherein

Q denotes a nitrogen or phosphorus atom;

$R^1$, $R^2$ and $R^3$ each denote a carbocyclic group or an alkyl group; $R^1$, $R^2$ and $R^3$ may be identical or different or two of these groups may together complete a 5-membered or 6-membered heterocyclic ring; and $X^\ominus$ denotes an anion.

Alkyl groups represented by $R^1$, $R^2$ and $R^3$ in formula I are straight-chained or branched and normally have 1 to 12 carbon atoms. Possible examples include methyl, ethyl, propyl, isobutyl, pentyl, hexyl, heptyl and dodecyl.

When $R^1$, $R^2$ and $R^3$ in formula I have the meaning of carbocyclic groups, these are substituted or unsubstituted cycloalkyl, aralkyl or aryl groups preferably having 5 to 12 carbon atoms, e.g. cyclopentyl, cyclohexyl, benzyl, p-methyl benzyl, chlorobenzyl, nitrobenzyl, cyanobenzyl, methoxy benzyl, methoxy carbonyl benzyl, ethylthio benzyl, phenyl and tolyl.

Examples of 5-membered or 6-membered heterocyclic rings completed by two of the groups $R^1$, $R^2$ and $R^3$ include inter alia the pyrrolidine, piperidine and morpholine rings.

The preferred carrier polymers include in particular those polymers which may be obtained from a mixture of monomers by one of the usual methods of addition polymerization, e.g. emulsion polymerization, and which contain both addition polymerizable monomers (A) which already contain a quaternary ammonium group or can easily be quaternized, and monomers (V) which contain at least two addition polymerizable groups and which have a cross-linking action as a result of being incorporated by polymerization in various (originally separate) polymer chains. Quaternization or introduction of quaternary groups may also be carried out after polymerization, for example by treating the tertiary amino groups in the polymer with an alkylating quaternizing agent or by reacting groups containing active halogen atoms in the polymer with tertiary amines or phosphines. The monomer mixture may also contain other modifying monomers (M) in addition to the monomers which are important for the presence of the quaternary groups and the monomers which effect cross-linking.

Suitable carrier polymers may therefore have, for example, the following structure:

$$(-A-)_x(-M-)_y(-V-)_z \qquad \text{II}$$

wherein

A denotes the residue of a polymerized monomer having at least one polymerizable ethylenically unsaturated group and at least one quaternary group;

V denotes the residue of a polymerized monomer having at least two polymerizable ethylenically unsaturated groups, e.g. vinyl groups;

M denotes the residue of a polymerized monomer having a polymerizable ethylenically unsaturated group;

x, y and z represent the numerical values of the proportions of the individual comonomers in the polymer, namely x represents 10 to 99 mol percent, y represents 0 to 90 mol percent, and z represents 0 to 5 mol percent.

Suitable monomers for the production of units A contain a polymerizable ethylenically unsaturated double bond and, linked thereto, a quaternary or quaternizable group. A group which is capable of being quaternized is understood in this context to be one which is capable of being converted into a quaternary group by an alkylating reaction. Examples of such quaternizable groups include inter alia a halogen methyl group attached to a phenyl group, and a tertiary amino methyl group attached to a phenyl group. In the case of the aforesaid halogen methyl group, quaternarization is carried out with tertiary amines or phosphines, whereas in the case of the tertiary aminomethyl group it is carried out with the usual quaternizing agents (alkylating agents). The term "alkylation" is used in this context to denote a reaction in which, for example, a bond is formed between the nitrogen atom of a tertiary amine and a carbon atom of an alkyl group (including substituted alkyl groups).

Particularly advantageous polymers for producing the dye preparations according to the invention are those of formula II wherein V denotes the residue of a monomer corresponding to the following formula III which contains at least two ethylenically unsaturated groups and is polymerizable by addition polymerization:

$$(CH_2{=}\overset{\displaystyle R^6}{\overset{|}{C}})_n{-}R^5 \qquad \text{III}$$

wherein n is an integer greater than 1, preferably 2, 3 or 4, $R^5$ denote an n-bonded organic group, and $R^6$ denotes a hydrogen atom or a methyl group.

$R^5$ may be, for example, a double-bonded or higher bonded organic residue built up of one or more binding elements selected from the group consisting of alkylene, arylene, aralkylene and cycloalkylene groups (or, in the case of multiple bonded organic groups, of the corresponding multiple bonded analogues of the above mentioned groups), ester, sulfonyl ester, amido and sulfonamide groups, ether oxygen atoms and thioether sulfur atoms. $R^5$ may be, for example, a methylene, ethylene, trimethylene, phenylene, phenylene-dioxy-carbonyl, 4,4'-isopropylidene-bis-phenylene-oxycarbonyl, methylene-oxycarbonyl, ethylene-dioxycarbonyl, 1,2,3-propan-tri-yl-tris-(oxycarbonyl), cyclohexylene-bis-(methylene-oxycarbonyl), ethylene-bis-(oxyethylene-oxycarbomnyl) or ethylidene-trioxycarbonyl group. It is preferred to use monomers which are stable in the presence of strong alkalis and not particularly reactive so that hydrolysis will not take place during copolymerization The following are examples of monomers from which the units V may be formed: divinyl benzene; allyl acrylate; allylmethacrylate; N-allylmethacrylamide; 4,4'-isopropylidene-diphenyl-diacrylate; 1,3-butylene-diacrylate; 1,3-butylene-dimethacrylate; 1,4-cyclohexylene-dimethylene-dimethacrylate; diethylene glycol-dimethacrylate; diisopropylene-glycol-dimethacrylate; ethylene-diacrylate; ethylene-dimethacrylate; ethylidene-diacrylate; 1,6-diacrylamido-hexane; 1,6-hexamethylenediacrylate; 1,6-hexamethylene-dimethacrylate; N,N'-methylene-bis-acrylamide; neopentylglycol-dimethacrylate; tetraethyleneglycol-dimethacrylate; tetramethylene-diacrylate; tetramethylene-dimethacrylate; 2,2,2-trichloroethylidene-dimethacrylate; triethyleneglycol-diacrylate; triethyleneglycol-dimethacrylate; ethylidyne-trimethacrylate; 1,2,3-propanetriyl-triacrylate; vinyl methacrylate; 1,2,4-trivinyl-cyclohexane; and tetraallyloxyethane.

Trivinylcyclohexane, divinyl benzene, tetrallyl oxyethane and 1,4-butylene-dimethacrylate are particularly suitable monomers for the production of units V. Two or more of the above mentioned monomers may also be used together for producing units V of the polymers according to the invention.

Various monoethylenically unsaturated monomers capable of copolymerizing with the other monomers may be used for producing the units M. Here, also monomers having conjugated ethylenically unsaturated bonds may be used. These monomers and the polymerized units M produced from them do not contain quaternary groups.

The following are typical suitable monomers for producing the polymerized units M: ethylene; propylene; 1-butene; 4-methylpentene-1; styrene and α-methylstyrene; monoethylenically unsaturated esters of aliphatic acids, e.g. vinyl acetate, isopropenyl acetate, allyl acetate and the like; esters of ethylenically unsaturated mono- and dicarboxylic acids, e.g. methyl methacrylate, ethyl acrylate, glycidyl acrylate, glycidyl methacrylate or butyl acrylate, and other monoethylenically unsaturated compounds such as, for example, acrylonitrile and allyl cyanide, as well as certain conjugated dienes, e.g. butadiene, isoprene and 2,3-dimethyl-butadiene.

The units V are preferably present in quantities of 1.0 to 5.0 mol percent, units M in quantities of 0 to 45 mol percent and units A in quantities of 40 to 99 mol percent.

The carrier polymers used according to the invention may be prepared by the usual methods of emulsion polymerization, for example by emulsion polymerization of a monoethylenically unsaturated monomer (A) containing quaternary or quaternizable groups with a multiply unsaturated monomer (V) and a monoethylenically unsaturated monomer (M), suitably in the presence of an anionic surface-active compound, for example sodium lauryl sulfate, or in the presence of the sodium salt of a sulfonated condensate of an alkyl phenol-ethylene oxide condensate (e.g. Alipal, manufacturers: General Dyestuff Corp., U.S.A.) and the like and suitably in the presence of a radical former or radical initiator, for example in the presence of a Redox type initiator forming free radicals, e.g. potassium persulfate-sodium bisulfite; potassium persulfate-$Fe^{2+}$; $H_2O_2$-$Fe^{2+}$ and the like. Methods such as those described in U.S. Pat. No. 3,072,588, for example, may be employed.

If, instead of containing a quaternary group, monomer A contains a functional group capable of reacting with a tertiary amine or phosphine to form a quaternary group, the latex obtained from polymerization is reacted with a tertiary amine or tertiary phosphine corresponding to the following formula IV

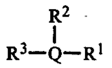

IV wherein $R^1$, $R^2$, $R^3$ and Q have the meaning indicated, suitably at temperatures of approximately −20° C. to approximately 150° C. A polymeric microgel latex is then obtained.

The carrier polymers used according to the invention are generally obtained in the form of a latex from which they may be isolated in a solid form when required. They may also easily be redispersed in water and have a particle diameter of less then 1 μm, preferably from 50 to 200 nm. Suitable carrier polymers have been described, for example, in German Offenlegungsschriften Nos. 2,551,790, 2,846,044 and 2,941,819. According to the last mentioned Offenlegungsschrift, the structural element A has a structure corresponding to the following formula

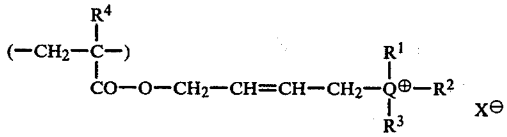

V wherein $R^1$, $R^2$, $R^3$ and $X^{\ominus}$ have the meaning already indicated and $R^4$ denotes hydrogen or alkyl, preferably methyl.

The following are examples of suitable carrier polymers according to the invention:

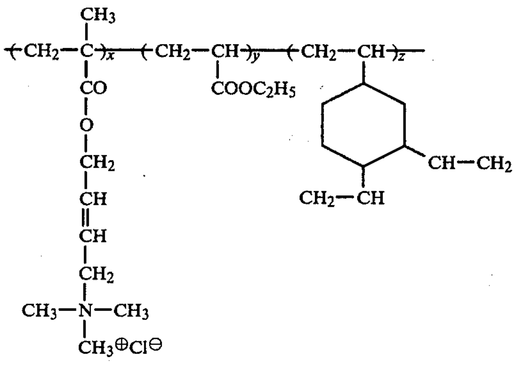

1

-continued
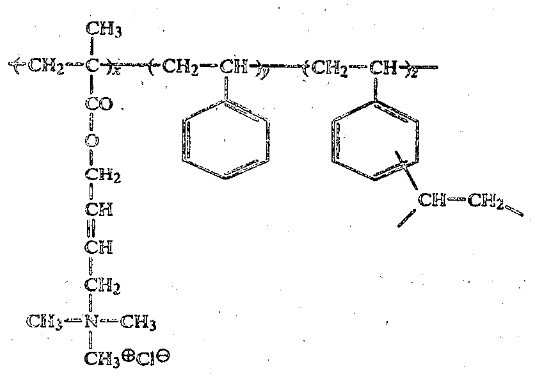
2
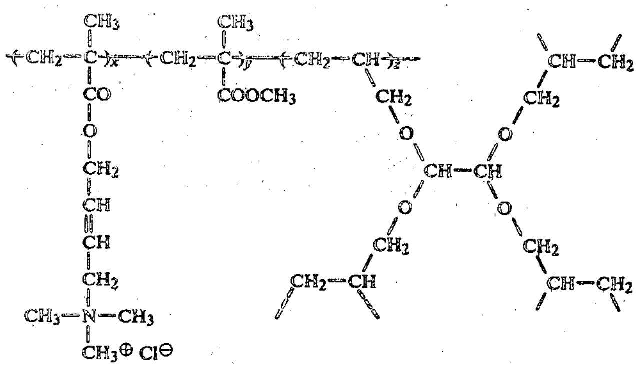
3
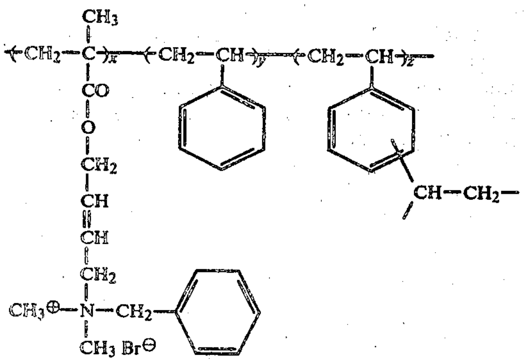
4
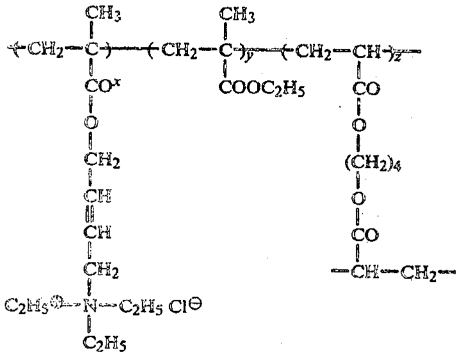
5

-continued

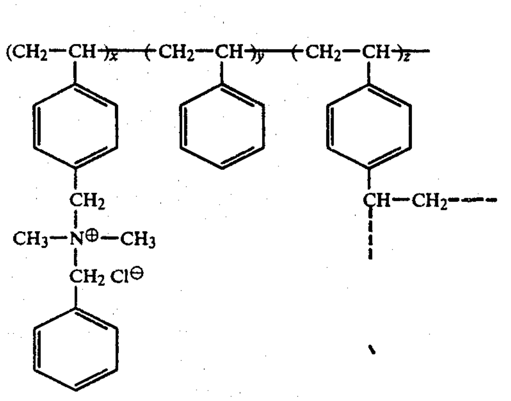

6

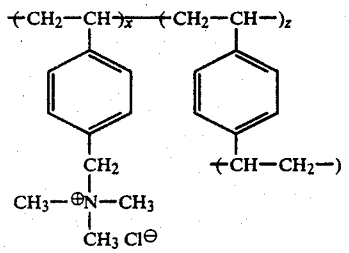

7

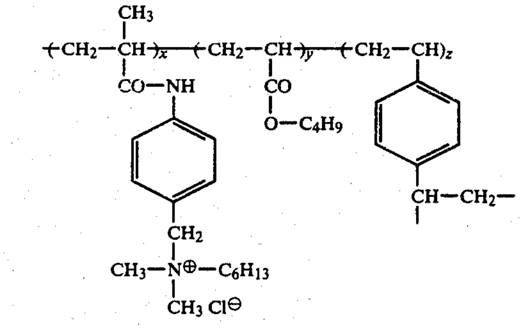

8

The dye preparation according to the invention also contains at least one acid dye as a further essential constituent. These dyes may be mainly those known to the man of the art as anti-halation or filter dyes. These are generally water-soluble and preferably have at least two sulfo groups per molecule. They are distinguished by having desirable spectral characteristics and by undergoing decolorisation in the photographic process or being washed out of the layers. Examples of such dyes are given below.

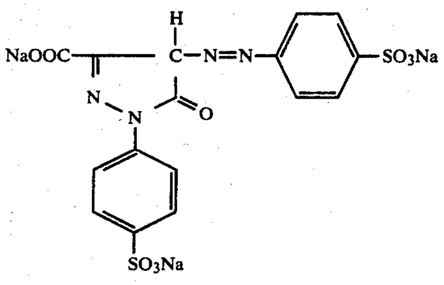

1

-continued

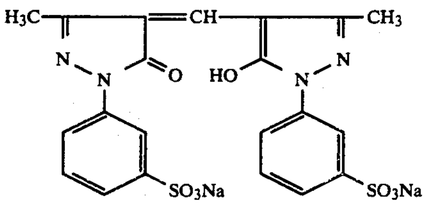

2

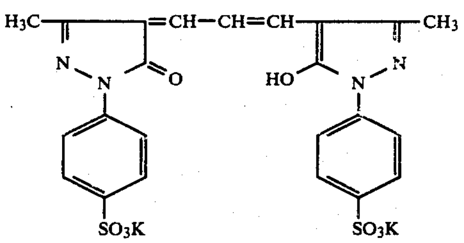

3

-continued
4
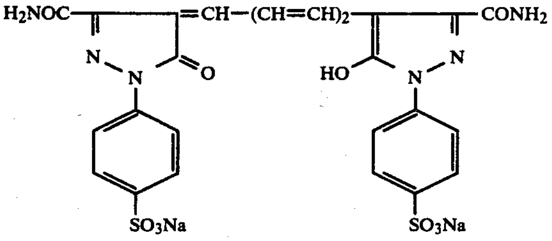
5
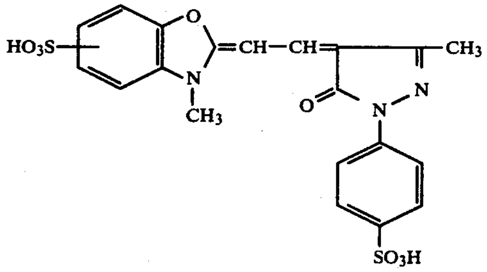
6
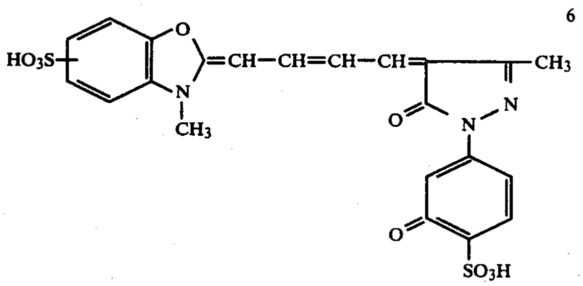
7
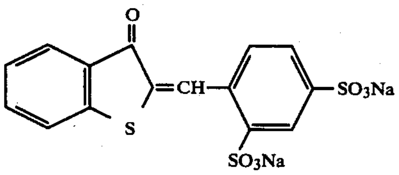
8
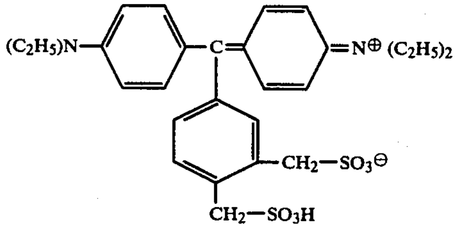
9
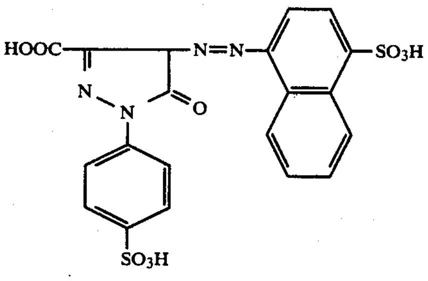
-continued
10
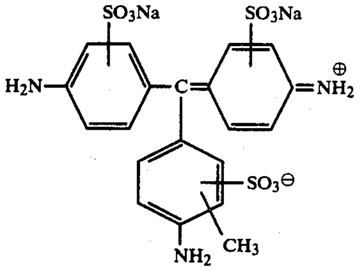
11
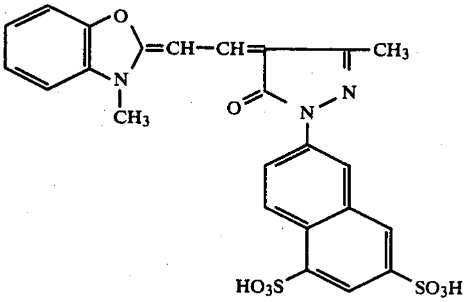
12
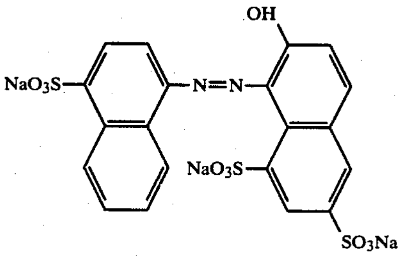
13
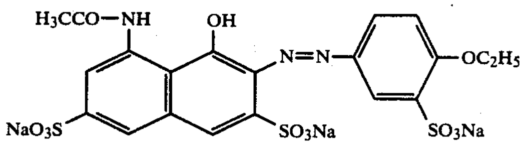
14
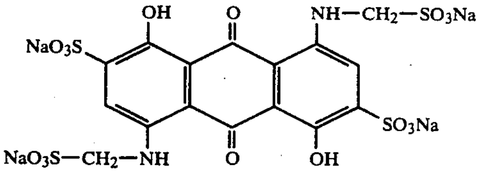
15
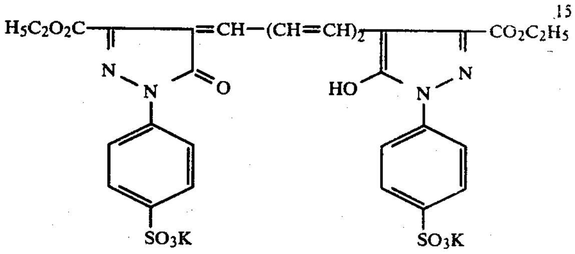

-continued

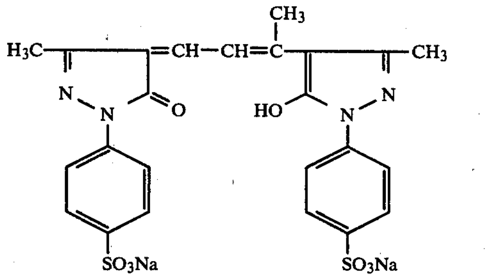

16

The dye preparation according to the invention is produced by stirring up an aqueous dispersion of the above mentioned carrier polymers with an aqueous solution of the acid dye. The dye is bound to the polymer particles by an ion exchange reaction which is in most cases accompanied by a slight increase in the average particle diameter. From the resulting polymer-dye dispersion, the dye preparation according to the invention can easily be isolated in a solid form, e.g. a powder, by known methods. In this form, it can be stored indefinitely and can be converted into an aqueous dispersion whenever required by stirring it up with water. These products are so-called self-dispersing dye preparations, which require no additives such as wetting agents or binders for their dispersion, and which spontaneously form finely disperse systems with water without the aid of dispersing apparatus such as mixing sirens. The dye preparations according to the invention may, if desired, be converted in known manner, e.g. by pressure agglomeration, into tablets or into capsules or granulates, for example for more convenient dispersion or dust-free handling. Binders such as gelatine, polyvinyl pyrrolidone or carboxymethyl cellulose may be used for ths purpose. See "Römpps Chemie-Lexikon", 7th Edition, pages 3453 and 3454.

Colored layers for use in photographic materials, in particular filter layers or anti-halation layers, which are at least equal in quality to the colored layers produced by conventional processes from mordants and dyes, can easily be produced with the aid of the dye preparations according to the invention. The advantages obtained by using the dye preparation according to the invention include the greater facility with which it can be kept in storage and the considerably simpler and more trouble free method of preparing the casting solutions for the colored layers.

EXAMPLE 1

53.8 g of poly-(N,N,N-trimethyl-N-4-methylacryloylbutenyl-ammonium chloride-co-styrene-co-divinyl benzene) 49/49/2 mol percent (polymer 2) are mixed as a 12.7% aqueous dispersion with a solution of 1.008 g of dye 12 in 50 ml of water. The dye-polymer dispersion obtained is precipitated by the addition of 500 of acetone, filtered off, washed twice with a little acetone and dried under vacuum at temperatures of up to 30° C. A red dye-mordant powder is obtained.

Redispersion test 9 g of water are added to 1 g of the powder and the mixture is stirred for 5 minutes at room temperature. A finely dispersed latex is obtained. The particle sizes of the latex mordant used and of the redispersed dye preparation are determined by laser light scattering measurements (see Table 1).

EXAMPLE 2

1.461 g of dye 14 are added with stirring to 83.2 g of the polymer described in Example 1 used as a 12.7% dispersion. After 30 minutes stirring, the dye-polymer dispersion obtained is filtered, precipitated by the addition of 500 ml of acetone, filtered off, washed twice with a small quantity of acetone and dried under vacuum at 30° C. A redispersible blue dye-mordant powder is obtained. For particle size, see Table 1.

EXAMPLE 3

41.8 g of dye 2 are added to 400 g of the polymer described in Example 1 used as 14.7% dispersion. After 1 hour, the polymer-dye dispersion obtained is precipitated with 2 liters of acetone and filtered. The residue is stirred up with acetone, suction-filtered and dried. A yellow redispersible powder is obtained. For particle size, see Table 1.

EXAMPLE 4 (Comparison)

A solution of 1.008 g of dye 12 in 50 ml of water is added with stirring to 34.16 g of a 20% aqueous solution of the cationic polyurethane according to German Offenlegungsschrift No. 2,315,304 corresponding to the following formula:

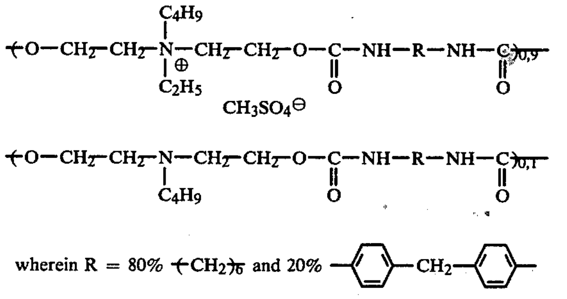

A yellow precipitate in the form of floccules appears which is neither soluble in water nor redispersible.

The particles sizes of the mordant latices and of the dye-mordant latices according to the invention are shown in Table 1 below. The increase in particle size indicates that the dye has reacted with the latex particles by an ion exchange reaction. The comparison polymer reacts with the dye to form associates which cannot be cast to form transparent layers after they have been mixed with gelatine. The dispersion of the dye preparation according to the invention may be mixed with gelatine and cast to form transparent layers.

TABLE 1

| | Average Particle diameter | | Layer after mixing |
|---|---|---|---|
| Example | Mordant | Mordant + Dye | with gelatine |
| 1 | 113 nm | 150 nm | transparent |
| 2 | 113 nm | 138 nm | transparent |
| 3 | 113 nm | 151 nm | transparent |
| 4 (comparison) | solution | >1000 nm | cloudy |

EXAMPLE 5

The colored layers produced from the dye preparations according to the invention described in Examples 1, 2 and 3 by mixing them with gelatine solution and casting the mixture on a layer support were compared with layers of equal concentration which had been prepared from the same mordant-dye combination but by the following conventional method. An aqueous mordant solution is added in the appropriate quantity to 50 ml of a 10% gelatine solution at 40° C. The mordant solutions are adjusted to a cationic group content of 0.22 equivalents per 1000 ml. The clear or milky cloudy solutions obtained are diluted to 100 ml with water.

50 ml of an aqueous dye solution is added with vigorous stirring to each of the gelatine solutions containing mordant, and the product is cast on a cellulose triacetate support by the immersion casting process at pH 5.5–6.0 to form a filter layer 2.0–2.5 μm in thickness.

To test for diffusion resistance, the dye layers are washed in running water for 16 hours and the density is determined before and after washing. In addition, the materials are subjected to the following color negative process:

Color development

3¼ minutes at 38° in a developer consisting of

| | |
|---|---|
| Sodium hexamethaphosphate | 2 g |
| Sodium sulfite (sicc) | 2.0 g |
| Sodium bicarbonate | 8 g |
| Sodium bisulfate | 7 g |
| Potassium bromide | 1.8 g |
| Sodium carbonate (sicc) | 30 g |
| Hydroxylamine sulfate | 3 g |
| 4-amino-3-methyl-N—ethyl-N—(β-hydroxyethyl)-aniline | 2.6 g |

Further processing is carried out at 38° C. in the following baths:

| | |
|---|---|
| Bleaching bath | 4 minutes 20 seconds |
| Washing | 1 minute 5 seconds |
| Fixing | 4 minutes 20 seconds |
| Washing | 3 minutes 15 seconds |

The formulations of the baths used are described in "The British Journal of Photography" July 1974, pages 597 and 598.

All the gelatine solutions give rise to clear layers when cast in the fresh state.

The color density measured before washing (A), after washing (B) and after color negative processing (C) is shown in Table 2 below:

TABLE 2

| Dye + Mordant according to Example | Time of Measurement | Color Density: According to the invention | Color Density: Comparison |
|---|---|---|---|
| 1 | A | 0.80 | 0.81 |
| | B | 0.79 | 0.82 |
| | C | 0.06 | 0.05 |
| 2 | A | 0.75 | 0.78 |
| | B | 0.77 | 0.79 |
| | C | 0.02 | 0.03 |
| 3 | A | 0.70 | 0.73 |
| | B | 0.68 | 0.71 |
| | C | 0 | 0 |

We claim:

1. A self-dispersing solid dye preparation free of binder consisting substantially of (a) a water-soluble acid dye containing at least two sulfo groups per molecule, and (b) a water-insoluble basic carrier for the acid dye, wherein the basic carrier consists of cross linked polymer particles having an average particle diameter of less than 1 μm and having a quaternary ammonium or phosphonium group content of at least 2 mval/g and the polymer having recurrent units of the following structure $$(-A-)_x(-M-)_y(-V-)_z$$

wherein

A denotes the residue of a polymerized monomer having at least one polymerizable ethylenically unsaturated group and at least one quaternary ammonium or phosphonium group;

V denotes the residue of a polymerized monomer having at least two polymerizable ethylenically unsaturated groups;

M denotes the residue of a polymerizable monomer having a polymerizable ethylenically unsaturated group x,y,z represent the numerical values of the proportions of the individual comonomers in the polymer, such that x denotes 10 to 99 mol percent, y denotes 0 to 90 mole percent, and z denotes 1 to 5 mol percent.

2. A self-dispersing solid dye preparation free of binder consisting substantially of (a) a water-soluble acid dye containing at least two sulfo groups per molecule, and (b) a water-insoluble basic carrier for the acid dye, wherein the basic carrier is a polymer having recurrent units of the following structure $$(-A-)_x(-M-)_y(-V-)_z$$

wherein the structural element A corresponds to the following formula:

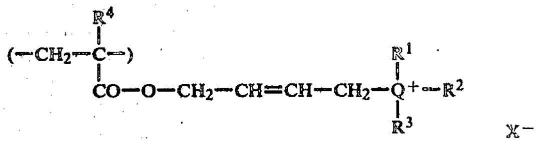

wherein

Q denotes a nitrogen or phosphorus atom;

$R^1$, $R^2$ and $R^3$ each denote a carbocyclic group or an alkyl group; $R^1$, $R^2$ and $R^3$ may be identical or different or two of these groups may together complete a 6-membered or 6-membered heterocyclic ring;

$R^4$ denotes hydrogen or alkyl; and $X^-$ denotes a anion

V denotes the residue of a polymerized monomer having at least one polymerizable ethylenically unsaturated groups;

M denotes the residue of a polymerizable monomer having a polymerizable ethylenically unsaturated group;

x,y,z represent the numerical values of the proportions of the individual comonomers in the polymer, such that x denotes 10 to 99 mol percent, y denotes 0 to 90 mol percent, and z denotes 1 to 5 mol percent.

* * * * *